United States Patent

Shirinian et al.

[11] 4,323,666
[45] Apr. 6, 1982

[54] COPOLYMERS OF VINYL ACETATE, ETHYLENE AND PEROXY ALKYL ACRYLATE

[76] Inventors: Vram T. Shirinian, ulitsa Proletarskaya, 58, kv. 21; Suren S. Mnatsakanov, prospekt Metallistov, 50, kv. 165; Valery N. Pavljuchenko, prospekt Energetikov, 34, kv. 53; Mark E. Rozenberg, Kondratievsky prospekt, 79, kv. 159; Valery V. Gromov, ulitsa Vernosti, 38, korpus 3, kv. 80; Sergei S. Ivanchev, ulitsa Nalichnaya, 36/3, kv. 97, all of Leningrad, U.S.S.R.

[21] Appl. No.: 227,062
[22] PCT Filed: Apr. 24, 1979
[86] PCT No.: PCT/SU79/00024
§ 371 Date: Dec. 12, 1980
§ 102(e) Date: Dec. 12, 1980
[87] PCT Pub. No.: WO80/02289
PCT Pub. Date: Oct. 30, 1980
[51] Int. Cl.³ .................. C08F 210/02; C08F 220/28
[52] U.S. Cl. ................... 526/329; 525/262; 526/319
[58] Field of Search .................. 526/319, 329

[56] References Cited

U.S. PATENT DOCUMENTS 3,200,103 8/1965 Chadha ..................... 526/319
3,779,992 12/1973 Liu et al. ..................... 526/319

*Primary Examiner*—Harry Wong, Jr.
*Attorney, Agent, or Firm*—Fleit & Jacobson

[57] ABSTRACT

Novel chemical compounds, copolymers of vinyl acetate, ethylene and peroxy alkyl acrylate having the following general formula:

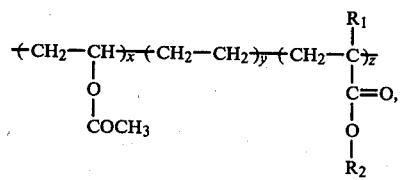

wherein
$R_1$ represents a normal alkyl, $-CH_3$, $-C_2H_5$, $-C_3H_7$, $-C_4H_9$, or $-C_5H_{11}$;
$R_2$ represents

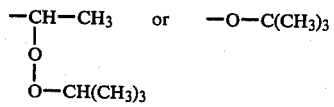

$x = 24.0$ to $89.9$ mole %;
$y = 10.0$ to $75.0$ mole %;
$z = 0.1$ to $1.0$ mole %.

1 Claim, No Drawings

COPOLYMERS OF VINYL ACETATE, ETHYLENE AND PEROXY ALKYL ACRYLATE

FIELD OF THE INVENTION

The present invention relates to novel chemical compounds, and more particularly to copolymers of vinyl acetate, ethylene and peroxy alkyl acrylate.

The proposed compounds are usable as binders in the production of water resistant emulsion paints, and of water resistant and weather resistant coatings and compositions, in low-shrinkage polyester-based moulding materials, or as plasticizers for polymethyl methacrylate, polyvinyl chloride, and other polymers.

The proposed copolymers are novel compounds which have no analogues in the prior art literature.

The copolymers of vinyl acetate, ethylene and peroxy alkyl acrylate have the following general formula:

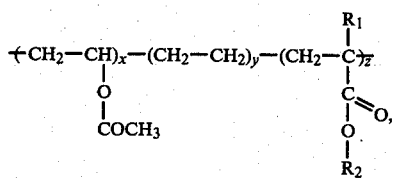

wherein $R_1$ represents a normal alkyl such as $-CH_3$, $-C_2H_5$, $-C_3H_7$, $-C_4H_9$, or $-C_5H_{11}$;
$R_2$ represents

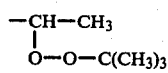

or $-O-C(CH_3)_3$;
$x = 24.0-89.9$ mole %; $y = 10.0-75.0$ mole %; $z = 0.1-1.0$ mole %.

Said novel copolymers comprise in their structure reactive peroxy-type functional groups which can be used for copolymer cross-linking or grafting various vinyl monomers thereon.

Depending on the copolymer composition and production method employed, the copolymers can have a molecular mass of from 20,000 to 125,000 and a glass transition temperature within 16° to 37° C. Water resistance of the copolymers, as defined by swelling in an atmosphere saturated with water vapour, largely depends on the proportion of peroxy monomer units in the copolymer structure and varies within 0.9 to 8.6% based on the initial copolymer mass.

The mechanical properties of films produced from the proposed copolymers depend upon copolymer composition. Ultimate tensile strength is 35 to 194 kgf/cm², with elongation ranging from 660 to 1050%. After a heat treatment at a temperature of 110° C., ultimate tensile strength can be increased up to 51-245 kgf/cm², with elongation dropping to 540-810%.

Copolymer composition was calculated using the data on the active oxygen content in the copolymers, as obtained by iodometric analysis, and the measurements in the IR spectra of the absorption band intensities within the region of 1433 cm⁻¹ (deformation vibrations of the $-CH_2$-groups of the vinyl acetate units) and within the region of 2925 cm⁻¹ (valent vibrations of the $-CH_2$-groups of the ethylene units). To obtain the IR spectra, 10% solutions of copolymers in carbon tetrachloride were used.

Light scattering method was used to determine the molecular mass of the copolymers. Light scattering measurements were made using copolymer solutions in benzene at 30° C.

The glass transition temperatures of the copolymers were determined based on elastic modulus measurements taken at varying temperatures.

To determine the water resistance of the copolymers, 0.5 mm thick films were dried in a thermostat at a temperature of 60° C. during three hours and then maintained in a thermostat with a relative humidity of 100% at 20° C. for 24 hours.

SUMMARY OF THE INVENTION

The proposed new copolymers of vinyl acetate, ethylene and peroxy alkyl acrylate are prepared by copolymerising said monomers. The peroxy monomers used are 1-(α-alkyl acrylate)-1-tert-butyl peroxy ethanes or tert-butyl peroxy-α-alkyl acrylates having the general formula:

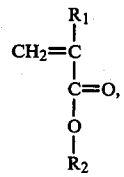

wherein $R_1$ is a normal alkyl such as $-CH_3$, $-C_2H_5$, $-C_3H_7$, $-C_4H_9$ or $-C_5H_{11}$; and
$R_2$ is

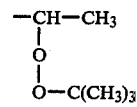

or $-O-C(CH_3)_3$

BEST MODE FOR CARRYING OUT THE INVENTION

Copolymerisation can be carried out in emulsion, suspension, or in a solvent system in the presence of a radical type initiator.

The initiators used for emulsion copolymerisation are water soluble types, such as potassium persulphate or redox systems based thereon, thus a potassium persulphate—sodium metabisulphate system.

The initiators used for suspension or solution copolymerisation methods are oil soluble types, such as azoisobutyrodinitrile.

The emulsifiers used for emulsion copolymerisation are ionic and nonionic emulsifiers and polymeric protective colloids, such as sodium lauryl sulphate, oxyethylated phenols, hydroxyethyl cellulose, or polyvinyl alcohol. To stabilize the coarse-particle emulsions in suspension copolymerisation, use is made of polymeric protective colloids and mineral stabilizers, such as barium sulphate.

In the emulsion and suspension copolymerisation methods, sodium bicarbonate or formic acid are used as alkalinity or acidity adjusters for the water phase.

Tert-butyl alcohol is used as solvent for solution copolymerisation.

Copolymerisation is carried out in an autoclave reactor of 5 or 27 liter capacity and fitted with a jacket and an anchor stirrer.

In emulsion copolymerisation, distilled water with the emulsion stabilizers and initiator dissolved in it is first charged into the autoclave, the charging of the vinyl acetate and peroxy alkyl acrylate constituents being done in increments of 5 to 50% of the total mass of said monomers.

The first portion of the vinyl acetate and peroxy alkyl acrylate mixture is charged into the autoclave, the reaction mixture is then stirred for 30 minutes at a speed of 100 to 250 rev/min and purged with ethylene to remove oxygen therefrom. Next, the reaction mixture is saturated with ethylene under pressure, and the temperature is raised to the required level for the copolymerisation to proceed. Two hours after, a second portion of the vinyl acetate and peroxy alkyl acrylate mixture is charged in. Following this, each subsequent portion is introduced 30 minutes after the charging of the previous one. After the last portion is charged in, the copolymerisation process is continued for another 1 to 2 hours.

Additional portions of the initiator and emulsifier may be introduced in the form of aqueous solutions throughout the copolymerisation to ensure higher process rates and increased stability of the dispersion formed in the process.

Emulsion copolymerisation is carried out at temperatures within 20° to 60° C. and pressures within 15 to 100 kgf/cm$^2$.

The product of the emulsion copolymerisation is a fine polymer dispersion in the form of a latex which can be used directly for the manufacture of films or coatings.

In suspension copolymerisation, distilled water containing the polymeric protective colloid and mineral stabilizer is charged into the autoclave, followed by charging, with stirring, of the vinyl acetate and peroxy alkyl acrylate mixture with the copolymerisation initiator dissolved therein. The reaction mixture is stirred then for 30 minutes at a speed of 100 to 250 rev/min and purged with ethylene to remove oxygen therefrom. Next, the reaction mixture is saturated with ethylene to give a pressure of 30 kgf/cm$^2$, following which the temperature is raised to 60° C. and the pressure brought up to 70 kgf/cm$^2$. Copolymerisation is then allowed to proceed under said conditions for 2 hours. Then the temperature is increased to 70° C., and the copolymerisation is continued for another 4 hours. After cooling the reaction mixture to 25° C., the copolymerisation product in the form of beads is discharged on to a filtering device to be then washed, dewatered, and dried at a temperature of 20° C.

For solution copolymerisation, tert-butyl alcohol is used as solvent.

The initiator and the first portion of the vinyl acetate and peroxy alkyl acrylate mixture dissolved in tertbutyl alcohol are charged into the autoclave. After saturating the reaction mixture with ethylene up to a pressure of 40 kgf/cm$^2$, the temperature is raised to 50° C., the pressure built up to 70 kgf/cm$^2$, and the copolymerisation allowed to proceed for 40 minutes. Then the vinyl acetate and peroxy alkyl acrylate mixture dissolved in tert-butyl alcohol is metered in, the temperature being raised to 60° C. Each subsequent portion of said monomer mixture is charged in 30 to 60 minutes after addition of the previous one. After cooling the reaction mixture to 30° C., the copolymerisation product is discharged in the form of solution of copolymer in tert-butyl alcohol.

For film manufacture and coating applications, the copolymers according to the present invention are used as polymer dispersions and solutions in tert-butyl alcohol. Copolymer separation from solutions and dispersions is achieved by precipitation into a 5% sodium chloride solution in water, followed by water washing and drying at 20° C. Copolymer samples to be used for molecular mass composition determinations are purified additionally by way of dissolving them in benzene (5% solutions being prepared) and then precipitating into water, the solution-to-water volume ratio being 1:10. Copolymer films used for mechanical testing are prepared directly from polymer dispersions or 5% solutions of the copolymers in benzene. For higher mechanical strength, the copolymers are crosslinked at the peroxy group sites by heat treatment at a temperature of 110° C.

EXAMPLE 1

A 5 liter jacketed autoclave equipped with an anchor stirrer is charged with 750 g of water, 55 g of polyvinyl alcohol having a 1.2 mass % content of acetate groups, 3 g of potassium persulphate, 1.5 g of sodium bicarbonate, and a mixture of 500 g of vinyl acetate and 1.5 g of 1-(α-methyl acrylate)-1-tert-butyl peroxy ethane. The contents of the autoclave are stirred at a speed of 250 rev/min for 30 minutes, then purged with ethylene. Following this, the reaction mass is saturated with ethylene to a pressure of 15 kgf/cm$^2$ at a temperature of 20° C. Then the temperature is raised up to 60° C., and the copolymerisation is allowed to proceed for 2 hours. Next, 5 portions of an emulsion are introduced, one after every 30 minutes. Each portion contains 150 g of water, 200 g of vinyl acetate, 5 g of 1-(α-methyl acrylate)-1-tert-butyl peroxy ethane, and 5 g of polyvinyl alcohol. After the fifth portion is in the reactor, 50 g of a 4% potassium persulphate solution is added, and the copolymerisation is being continued for another 2 hours. Then the reaction mixture is cooled to 25° C., and the product dispersion is discharged.

The copolymer thus obtained has the following characteristics: composition (mole %): vinyl acetate 89.9; ethylene 10.0
1-(α-methyl acrylate)-1-tert-butyl peroxy ethane 0.1;
molecular mass 120,000;
glass transition temperature 32° C.;
  swelling 8.6%
  elongation 680%,
  after heat treatment at 110° C.–620%;
  ultimate tensile strength 35 kgf/cm$^2$,
  after heat treatment at 110° C.–51 kgf/cm$^2$.

EXAMPLE 2

Copolymerisation is carried out as described in Example 1, with 1-(α-propyl acrylate)-1-tert-butyl peroxy ethane (total quantity 60 g) used instead of 1-(α-methyl acrylate)-1-tert-butyl peroxy ethane as a peroxy monomer and 15 g of a mixture containing 7.5 g of hydroxyethyl cellulose and 7.5 g of an ethylene oxide—propylene oxide block copolymer employed as emulsifier.

The copolymer thus obtained has the following characteristics:
  composition (mole %):
  vinyl acetate 86.2
  ethylene 13.6
1-(α-propyl acrylate)-1-tert-butyl perox ethane 0.2;

molecular mass 110,000;
glass transition temperature 34° C.;
swelling 3.4%;
  elongation 700;,
  after heat treatment at 110° C.-640%;
  ultimate tensile strength 44 kgf/cm$^2$,
  after heat treatment at 110° C.-76 kgf/cm$^2$.

EXAMPLE 3

A 5 liter autoclave is charged with 1500 g of water, 4 g of sodium lauryl sulphate, 2 g of sodium bicarbonate, 5 g of potassium persulphate, and a mixture comprising 150 g of vinyl acetate and 32 g of 1(α-amyl acrylate)-1-tert-butyl peroxy ethane. The reaction mass is saturated with ethylene up to a pressure of 20 kgf/cm$^2$, the temperature is set at 20° C., the pressure at 50 kgf/cm$^2$, and, after adding 40 g of a 3% sodium metabisulphite solution, the copolymerisation is allowed to proceed for 2 hours. After that the temperature is raised up to 25° C., and the vinyl acetate and 1-(α-amyl acrylate)-1-tert-butyl peroxy ethane mixture is introduced in increments after every 30 minutes, 10 g of the 3% sodium metabisulphite solution being added with every portion of the monomer mixture. Each portion of the monomer mixture contains 100 g of vinyl acetate and 8 g of 1-(α-amyl acrylate)-1-tert-butyl peroxy ethane. After charging in the sixth portion of the reactants, the copolymerisation is continued for another hour, and then the dispersion is cooled to 25° C. and discharged.

The copolymer thus obtained has the following characteristics:
composition (mole %):
  vinyl acetate 61.6
  ethylene 37.9
1-(α-amyl acrylate)-1-tert-butyl peroxy ethane 0.5;
molecular mass 90,600;
  glass transition temperature 36° C.;
  swelling 2.8%;
  elongation 980%;
  after heat treatment at 110° C.-720%;
  ultimate tensile strength 96 kgf/cm$^2$,
  after heat treatment at 110° C.-135 kgf/cm$^2$.

EXAMPLE 4

Copolymerisation is carried out as described in Example 3, with 1-(α-ethyl acrylate)-1-tert-butyl peroxy ethane used as a peroxy monomer instead of 1-(α-amyl acrylate)-1-tert-butyl peroxy ethane. The first to go into the autoclave is a mixture of 500 g of vinyl acetate and 30 g of 1-(α-ethyl acrylate)-1-tert-butyl peroxy ethane, then 970 g of a mixture containing 850 g of vinyl acetate and 120 g of 1-(α-ethyl acrylate)-1-tert butyl peroxy ethane is added in 6 equal portions, one after every 30 minutes. Copolymerisation is carried out at a pressure of 100 kgf/cm$^2$.

The copolymer thus obtained has the following characteristics:
composition (mole %):
  vinyl acetate 24.0
  ethylene 75.0
1-(α-ethyl acrylate)-1-tert-butyl peroxy ethane 1.0;
  molecular mass 75,000;
  glass transition temperature 37° C.;
  swelling 1.2%;
  elongation 1050;,
  after heat treatment at 110° C.-180%;
  ultimate tensile strength 174 kgf/cm$^2$,
  after heat treatment at 110° C.-245 kgf/cm$^2$.

EXAMPLE 5

Copolymerisation is carried out as described in Example 1, with the difference that 1-(α-butyl acrylate)-1-tert-butyl peroxy ethane is used as a peroxy monomer instead of 1-(α-methyl acrylate)-1-tert-butyl peroxy ethane. Initially 35 g of 1-(α-butyl acrylate)-1-tert-butyl peroxy ethane is charged into the autoclave, and the remaining amount is metered in five increments weighting 5 g each. Copolymerisation is carried out at a pressure of 30 kgf/cm$^2$.

The copolymer thus obtained has the following characteristics:
composition (mole %):
  vinyl acetate 79.5
  ethylene 20.5
1-(α-butyl acrylate)-1-tert-butyl peroxy ethane 0.3;
  molecular mass 95,000;
  glass transition temperature 30° C.;
  swelling 2.2%;
  elongation 760%,
  after heat treatment at 110° C.-680%;
  ultimate tensile strength 56 kgf/cm$^2$,
  after heat treatment at 110° C.-81 kgf/cm$^2$.

EXAMPLE 6

A 27 liter autoclave is charged with 8.5 kg of water, 600 g of 3,5-dinonyl phenyloxy decaethylene oxide, 14 g of sodium bicarbonate, 500 g of a 5% potassium persulphate solution, and a mixture comprising 970 g of acetate and 38 g of tert-butyl peroxy methacrylate. The reaction mixture is stirred at a speed of 100 rev/min, then purged with ethylene, and then saturated with ethylene to a pressure of 30 kgf/cm$^2$. Next, the temperature is set at 20° C., the pressure at 50 kgf/cm$^2$, and 50 g of a 10% sodium metabisulphite solution is added in. Thirty minutes later a mixture comprising 970 g of vinyl acetate and 12 g of tert-butyl peroxy ethane is introduced in ten equal portions, each subsequent portion being added 30 minutes after introduction of the previous one. After the tenth portion of the monomer mixture has been fed in, 100 g of a 5% solution of potassium persulphate is added into the autoclave, the temperature raised up to 30° C., and the copolymerisation continued for another 2 hours before the polymer dispersion is dicharged.

The copolymer thus obtained has the following characteristics:
composition (mole %):
  vinyl acetate 61.0
  ethylene 38.2
  tert-butyl peroxy methacrylate 0.8;
  molecular mass 90,600;
  glass transition temperature 34° C.;
  swelling 1.8;
  elongation 810%,
  after heat treatment at 110° C.-730%;
  ultimate tensile strength 71 kgf/cm$^2$,
  after heat treatment at 110° C.-92%.

EXAMPLE 7

A 27 liter autoclave is charged with 16 kg of water, 110 g of a 10% solution of polyvinyl alcohol containing 15.5 mass % of acetate groups, 10 g of barium sulphate, 4 g of formic acid, a mixture comprising 5 kg of vinyl acetate and 908 g of tert-butyl peroxy α-ethyl acrylate, and 25 g of azobisisobutyronitrile. The reaction mixture is stirred for 15 min, then purged with ethylene, and saturated with ethylene up to a pressure of 30 kgf/cm$^2$. Then the temperature is raised up to 60° C., the pressure is set at 70 kgf/cm$^2$, and the copolymerisation allowed to proceed for 2 hours. After that the temperature is increased up to 70° C., and the copolymerisation is being continued for another 4 hours. Then the contents of the autoclave is cooled to 25° C. and discharged on to a filtering device. The product obtained in the form of beads is washed, dewatered, and dried at 20° C.

The copolymer so prepared has the following characteristics:
composition (mole %):
vinyl acetate 57,0
ethylene 42.4
tert-butyl peroxy α-ethyl acrylate 0.6;
molecular mass 70,000;
glass transition temperature 28° C.;
swelling 0.9%;
elongation 960%,
after heat treatment at 110° C.–810%;
ultimate tensile strength 125 kgf/cm$^2$,
after heat treatment at 110° C.–158 kgf/cm$^2$.

EXAMPLE 8

Copolymerisation is carried out as described in Example 7, with the difference that 186 g of tert-butyl peroxy α-propyl acrylate is used as a peroxy monomer instead of tert-butyl peroxy α-ethyl acrylate, and the pressure (30 kgf/cm$^2$) is maintained constant throughout the copolymerisation process.

The copolymer thus obtained has the following characteristics:
composition (mole %):
vinyl acetate 82.6
ethylene 16.5
tert-butyl peroxy α-propyl acrylate 0.9;
molecular mass 80,000;
glass transition temperature 23° C.;
swelling 1.1%;
elongation 660%,
after heat treatment at 110° C.–540%;
ultimate tensile strength 95 kgf/cm$^2$,
after heat treatment at 110° C.–130 kgf/cm$^2$.

EXAMPLE 9

A 27 liter autoclave is charged with 5 kg of vinyl acetate, and 312 g of a mixture comprising 200 g of tert-butyl alcohol, 60 g of azobisisobutyronitrile and 52 g of tert-butyl peroxy α-butyl acrylate. After saturating the reaction mixture with ethylene to a pressure of 40 kgf/cm$^2$, the temperature is raised up to 50° C., the pressure is brought up to 70 kgf/cm$^2$, and the copolymerisation is allowed to proceed for 40 minutes. After that 1 kg of vinyl acetate, and 130 g of a mixture composed of 100 g of tert-butyl alcohol and 30 g of tert-butyl peroxy α-butyl acrylate are introduced into the autoclave, and the copolymerisation is being continued for another hour. Then 500 g of vinyl acetate and 20 g of tert-butyl peroxy α-butyl acrylate are added into the autoclave. Then, 30 minutes later, said monomers are added again in the same amounts, the temperature is increased to 60° C. and so maintained for the duration of 40 minutes, following which 1 kg of vinyl acetate and 20 g of tert-butyl peroxy α-butyl acrylate are added in. One hour after introduction of said quantities of monomers, 1300 g of tert-butyl alcohol is charged in, and the copolymerisation is being continued for another hour. Then the polymer solution so prepared is cooled to 30° C. and discharged.

The copolymer thus obtained has the following characteristics:
composition (mole %):
vinyl acetate 45.6
ethylene 54.0
tert-butyl peroxy α-butyl acrylate 0.4;
molecular mass 20,000;
glass transition temperature 18° C.;
swelling 2.9%;
elongation 950%,
after heat treatment at 110° C.–800%;
ultimate tensile strength 86 kgf/cm$^2$,
after heat treatment at 110° C.–110 kgf/cm$^2$.

EXAMPLE 10

Copolymerisation is carried out as described in Example 9, with the difference that tert-butyl peroxy α-amyl acrylate is used as a peroxy monomer instead of tert-butyl peroxy α-butyl acrylate.

The copolymer so prepared has the following characteristics:
composition (mole %):
vinyl acetate 46.9
ethylene 52.8
tert-butyl peroxy α-amyl acrylate 0.3;
molecular mass 23,000;
glass transition temperature 16° C.;
swelling 3.6%;
elongation 1000%,
after heat treatment at 110° C.–850%;
ultimate tensile strength 80 kgf/cm$^2$,
after heat treatment at 110° C.–98 kgf/cm$^2$.

EXAMPLE 11 (CONTROL)

Copolymerisation is carried out as described in Example 1, but without using any peroxy alkyl acrylate.

The copolymer obtained has the following characteristics:
composition (mole %):
vinyl acetate 89.0
ethylene 11.0;
molecular mass 125,000;
glass transition temperature 22° C.;
swelling 26.5%;
elongation 900%,
after heat treatment at 110° C.–800%;
ultimate tensile strength 17 kgf/cm$^2$,
after heat treatment at 110° C.–20 kgf/cm$^2$.

INDUSTRIAL APPLICABILITY

The proposed terpolymers of vinyl acetate, ethylene and peroxy alkyl acrylate are usable as binders in the production of water resistant and weather resistant coatings and compositions utilized in low-shrinkage polyester-based moulding materials.

The proposed copolymers can also be used as plasticizers for polymethyl methacrylate, polyvinyl chloride, and other polymers. As plasticizers, they can be introduced either during processing, or at the stage of synthesis.

The copolymers of the present invention can also be used as the basis for synthesizing various graft copolymers featuring enhanced impact strength and weather resistance.

Compared to the conventional bipolymers of vinyl acetate and ethylene, the copolymers of the present invention are higher in water resistance and mechanical strength. The properties mentioned hereinabove can be substantially improved during processing of the copolymers at elevated temperatures by way of cross-linking associated with the decomposition of the peroxy groups comprised in the copolymer structure.

We claim:

1. Copolymers of vinyl acetate, ethylene and peroxy alkyl acrylate of the general formula:

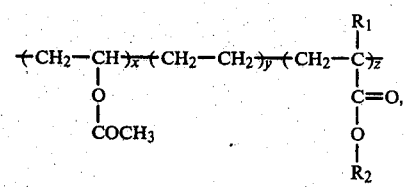

wherein
$R_1$ represents a normal alkyl $-CH_3$, $-C_2H_5$, $-C_3H_7$, $-C_4H_9$, or $-C_5H_{11}$;
$R_2$ represents

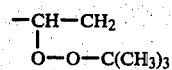

or $-O-C(CH_3)_3$;
$x=24.0$ to $89.9$ mole %; $y=10.0$ to $75.0$ mole %; $z=0.1$ to $1.0$ mole %.

* * * * *